(12) United States Patent
Sullivan

(10) Patent No.: US 6,539,969 B1
(45) Date of Patent: Apr. 1, 2003

(54) TWO-PIECE VALVE AND GAS CYLINDER

(75) Inventor: Brian Sullivan, Alta Loma, CA (US)

(73) Assignee: Pursuit Marketing, Inc, Des Plaines, IL (US)

( * ) Notice: Subject to any disclaimer, the term of this patent is extended or adjusted under 35 U.S.C. 154(b) by 133 days.

(21) Appl. No.: 09/723,626

(22) Filed: Nov. 27, 2000

(51) Int. Cl.[7] .............................................. B65B 31/06
(52) U.S. Cl. ............................... 137/15.18; 251/149.6; 251/367; 124/74; 141/349
(58) Field of Search ............................ 251/149.6, 366, 251/367; 137/15.18; 141/323, 348, 349; 124/73, 74

(56) References Cited

U.S. PATENT DOCUMENTS

| | | |
|---|---|---|
| 4,210,168 A | 7/1980 | Yonezawa |
| 4,799,646 A | 1/1989 | Rollett |
| 5,048,554 A | 9/1991 | Kremer |
| 5,309,945 A | 5/1994 | Sakai et al. |
| 5,381,998 A | 1/1995 | Griffin |
| 5,613,483 A * | 3/1997 | Lukas et al. .............. 124/74 X |
| 5,738,145 A | 4/1998 | Daicho et al. |
| 5,743,285 A | 4/1998 | Shalkevich |
| 6,047,727 A | 4/2000 | Hatori |
| 6,405,722 B2 * | 6/2002 | Colby .......................... 124/74 |

* cited by examiner

*Primary Examiner*—Kevin Lee
(74) *Attorney, Agent, or Firm*—Michael G. Kelber; Gary R. Jarosik

(57) ABSTRACT

The invention provides an improved gas cylinder and valve for filling or discharging a gas cylinder comprising a body having a first end, a second end, and an axial bore for providing a passageway for flow of fluid. A collar is provided having an outer surface for engaging an external member to the valve for accepting or discharging fluid. A core is provided having an axial bore for receiving a pin disposed within the body and providing a passageway for flow of the fluid. The first end of the body is adapted to removably mount and rotationally fix the collar. The first end of the body is further adapted to removably receive the core, whereby the core retains the collar on the body when the core is received by the body.

26 Claims, 4 Drawing Sheets

FIG. I

TWO-PIECE VALVE AND GAS CYLINDER

FIELD OF THE INVENTION

The present invention relates to gas cylinders and valves therefor.

BACKGROUND OF THE INVENTION

Gas cylinders, also known as tanks or canisters, are widely used to contain various compressed and/or liquified gases for countless applications. For example, carbon dioxide gas is commonly compressed in cylinders for use in the sport of paintball to power paintball "markers," or "guns," which propel a paintball to an intended target. Similarly, nitrogen can be compressed in cylinders for various uses, including paintball guns. In another example, propane is frequently compressed in cylinders for use in fueling lanterns, stoves, barbeque grills, camping gear, welding torches, etc. Gas cylinders are commonly adapted to be filled with fluid (either gas, liquid or a combination of both), discharged for an application, and then refilled, repeatedly.

Gas cylinders typically include a valve for controlling the flow of fluid in to and out of the cylinder. Commonly, the valve is adapted to attach both to an external filling member for filling the cylinder with fluid and to an external appliance member for discharging the fluid to an appliance for the intended application, for example, a paintball gun, lantern, barbeque grill, etc. A conventional valve has an attachment mechanism on one end of the valve for removably attaching the canister to an external member and second end of the valve is attached to a gas chamber for containing a fluid. Typically the second end of the valve is permanently secured to the chamber by the manufacturer, as accidental detachment of the valve from a filled chamber could result in an explosion of the chamber or firing of the valve.

The valve body typically includes an axial bore for allowing the flow of fluid through the body. A pin is commonly disposed within the valve body. In one arrangement, the pin is biased by a spring in a closed position, wherein the pin is maintained in a sealed position against the body. When the pin is urged against the spring, the pin is displaced away from the body in an open position, allowing fluid to flow through the valve body. When the pin is released, the spring urges the pin back into a closed position sealing the pin against the body and arresting the flow of fluid through the valve.

Over repeated use and refilling, the attachment mechanism of the first end of the valve can begin to wear, and eventually, the attachment mechanism can lose its ability to safely attach the gas cylinder to an external appliance. This condition can be extremely dangerous, since the fluid in the gas cylinder is typically under enormous pressure and, in some cases, is flammable, for example, in the case of propane. Once the valve has worn or deteriorated to the point where it no longer safely attaches to an external appliance, either the gas cylinder must be discarded or the gas cylinder must be refurbished by replacing the entire valve mechanism. The internal valve mechanism often has a much longer working life than that of the attachment mechanism. As a result, the valve (and possibly the entire gas cylinder) is typically discarded long before desirable.

Some compressed gases remain in a partially liquified state in a gas cylinder, for example, carbon dioxide. When carbon dioxide or other gases are used with paintball guns, the introduction of liquid propellant into the gun, particularly the firing mechanism (a condition known as "going liquid"), is undesirable, because liquified gas occupies a much smaller volume, and thus once the liquid evaporates within the firing mechanism, an excessive amount of gas creates excessive pressure for firing the gun, known as having a "hot" gun.

Many conventional paintguns are configured with an air supply adapter, or "ASA," attached to the handle in an orientation where the gas cylinder is attached to the paintgun in a horizontal position, so the gas cylinder can act as a shoulder stock. Undesirably, this configuration promotes the introduction of liquid propellant into the paintgun intake line, and occasionally to the firing mechanism. To reduce the entry of liquified gas into the firing mechanism, special gas cylinders have been devised with a syphon attached to the valve within the cylinder and bending towards the wall of the cylinder. Because gas cylinders are attached by threaded valves, these specialized cylinders must be custom made so that when attached to a specific paintgun, the syphon faces upward away from gravity, desirably above the liquid line of the compressed gas when the paintgun is being aimed and fired. The drawback to this design is that specialized gas cylinders are expensive to customize and are not necessarily interchangeable with other paintguns.

The present invention overcomes these and other limitations of the prior art.

SUMMARY OF INVENTION

It is an object of the invention to provide an improved gas cylinder and valve comprising a body having a first end, a second end, and an axial bore for providing a passageway for flow of fluid, and a collar having an outer surface for engaging an external member for accepting or discharging fluid. A core is provided having an axial bore for receiving the pin and providing a passageway for flow of the fluid. The first end of the body is adapted to removably mount and rotationally fix the collar and is adapted to removably receive the core, whereby the core retains the collar on the body when the core is received by the body.

In another aspect of the invention, the second end of the body attaches to a chamber for containing fluid.

In another aspect of the invention, the present invention is made according to a method including the following steps. A collar is mounted on a body in a rotationally fixed position. A core is attached to the body, thereby maintaining the collar between the body and the core. A chamber is attached to the second end of the body.

The present invention also enables a selective adjustment of a gas cylinder having an internal syphon. A method for making a gas cylinder is provided wherein a syphon is attached to a body having an axial bore defining an axis and the syphon has distal end that terminates away from the axis. The body is attached to a chamber with the syphon being inside the chamber. When the body is attached to the chamber, a chamber mark is provided on the chamber to indicate the direction in which the distal end of the syphon is pointed. The collar is fitted securely to an ASA on a paintgun and a collar mark is provided on the collar to indicate the upward orientation of the paintgun when the paintgun is in a firing position. The collar is detached from the paintgun and mounted on the body in a rotationally fixed position so that the collar mark is aligned with the chamber mark. A core is attached to the body to secure the collar to the body, whereby the collar is maintained between the body and the core when the core is attached to the body and the distal end of the syphon is oriented upward when the chamber is attached to the ASA.

The foregoing features and advantages of the present invention will be apparent from the following more detailed description of the invention. Other features and advantages of the invention will be apparent from the following detailed description and.

DETAILED DESCRIPTION OF THE INVENTION

Figure 1:
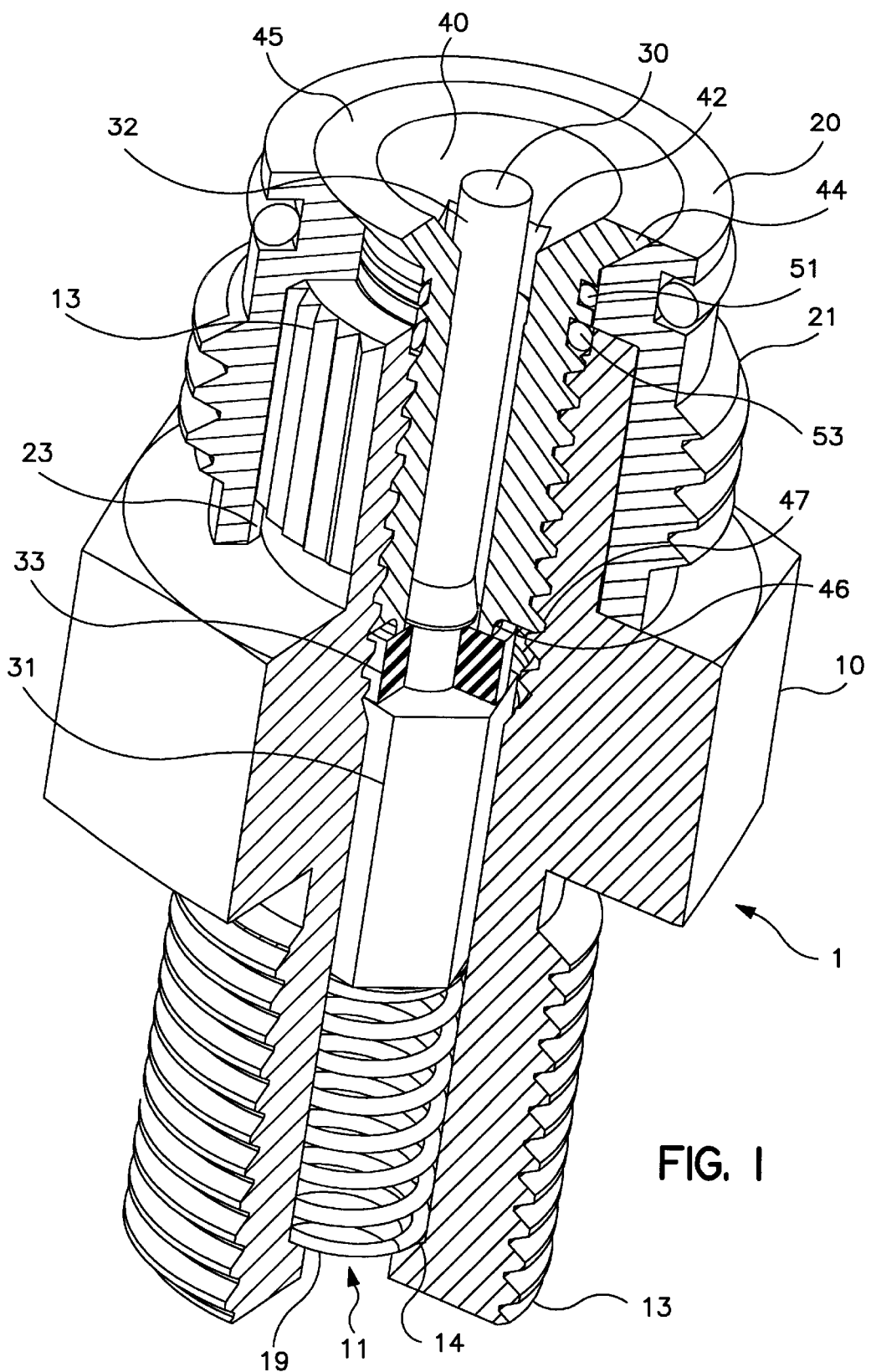
FIG. 1 is a cut-away prospective view of the valve of the present invention.

Turning to FIG. 1, in one embodiment of the invention includes a body 10. The body 10 has an axial bore 11 that provides a passageway for flow of fluid. A collar 20 is mounted on a first end 12 of the body 10. The collar 20 has an outer surface 21 that is adapted to attach to an external member (not shown) for accepting or discharging fluid. In one embodiment, the outer surface 21 of the collar 20 is threaded.

The collar 20 has an inner surface 23 that is adapted to mate with an outer surface 13 of the body to rotationally fix the collar 20 on the body 10. In one embodiment, outer surface 13 of the body 10 is splined and mates with a splined inner surface 23 of the collar 20. Other ways of rotationally and removably fixing the collar to the body may be used without departing from the invention. For example, another way to rotationally fix collar 20 is to insert a key into a keyway in the body 10 and into a keyway in the collar 20. In yet another embodiment, a pin is inserted in the body 10 and inserted in the collar 20.

The body 10 has a ledge 14 extending into the axial bore 11 to support a spring 19. FIG. 1 discloses a ledge 14 formed from a bore 11 in the body 10, but other support structures could be provided without departing from the invention, such as, inserting a pin or attaching a separate retaining structure to the body 10 to support the spring 19 in the axial bore 11. FIG. 1 discloses a helical spring, any biasing member could be used without departing from the invention, such as, a belveille spring, curved spring, or wave spring.

A pin 30 is disposed within the axial bore 11 of the body 10 and is selectively positioned along the axial bore 11. The pin 30 is biased by the spring 19. The pin 30 is formed to create a base 31 and a trigger 32. The base 31 is shaped to allow flow of fluid around the base 31 within the axial bore 11. A sealing member 33 is disposed on the pin 30 and supported by the base 31.

A core 40 is removably attached to the body 10. In one embodiment, the core 40 is in inserted into the axial bore 11 of the body 10. As shown in FIG. 1, the core 40 is threaded to mate with the body 10. Hexagonal socket 42 is provided in core 40 to fasten core 40 on body 10. As will be recognized by those of ordinary skill in the art, other ways of attaching the core to the body 10, such as other sockets, or keyed or slotted drives, may be used without departing from the invention. For example, the core 40 could be snap fit or pressure fit into the axial bore 11 or attached to the body 10 with adhesive or by welding.

The head 44 of the core retains the collar 20 on the body 10. The core 40 is adapted with a head 44 on a first end 45 and a sealing wall 46 on the second end 47. When the core 40 is attached to the body 10, the head 44 extends over a portion of the collar 20, retaining the collar 20 against the body 10. The core 40 could also be fixed to the collar 20 and the core 40 could then be removably pressure fitted onto the body 10.

The core 40 retains the pin 30 within the body 10. The sealing wall 46 is disposed against the sealing member 33 on the pin 30. The spring 19 biases pin 30 and thereby the sealing member 33 against the sealing wall 46 of the core 40 for movement of the pin 30 between a sealed position, arresting flow of fluid through the axial bore 11, and an open position, allowing flow of fluid through the axial bore 11 of the body 10.

Sealing member 51 is disposed between the core 40 and the collar 20 to prevent pressurized fluid from flowing between the core 40 and the collar 20 when an external member is forcing fluid into the valve. Sealing member 53 is disposed between the core 40 and the body 10 to prevent pressurized fluid from flowing between the core 40 and the body 10 when fluid is discharged from the valve to an external member.

Figure 2:
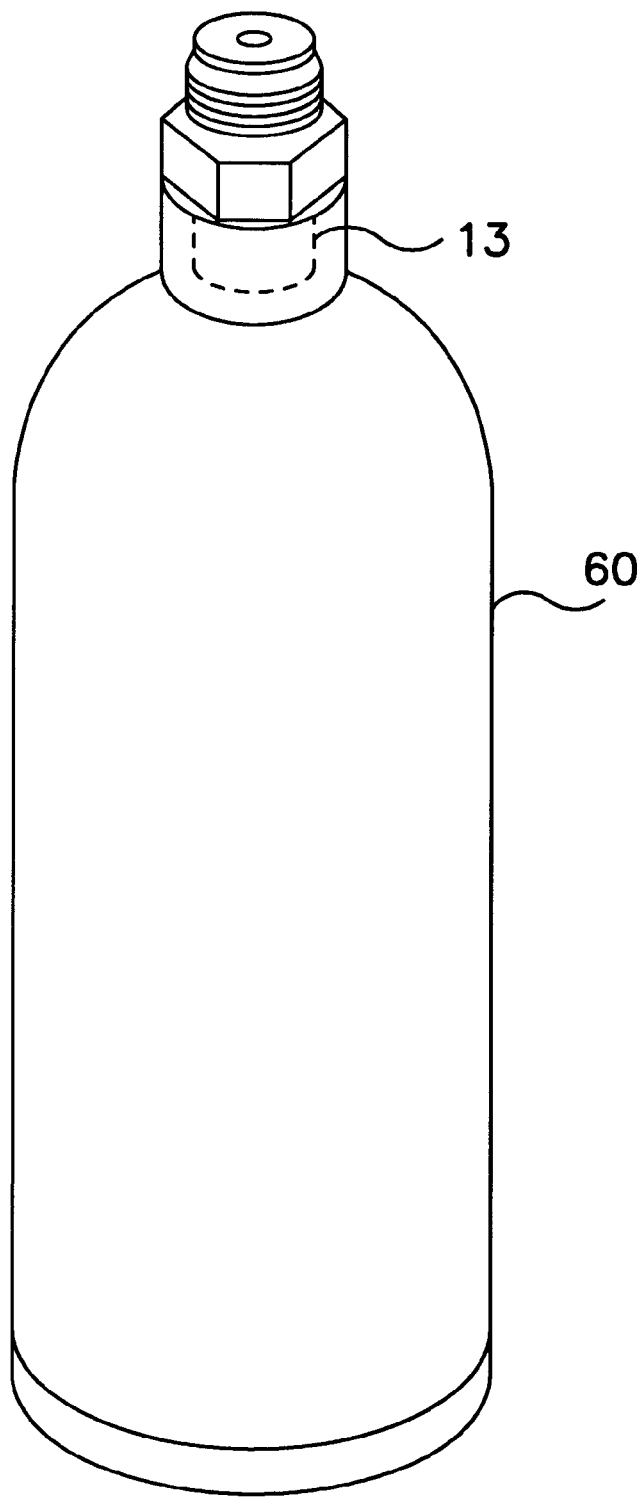
FIG. 2 is a plan view of a chamber and valve of the present invention.

As shown in FIG. 2, a chamber 60 for containing fluid is attached to the second end 13 of the body 10.

An embodiment of the present invention is made according to the following method. Collar 20 is mounted on a body 10 in a rotationally fixed position. The body 10 has an axial bore 11 to provide a passageway for flow of fluid. Spring 19 is disposed in the axial bore in the body 10 and retained by support 14. Pin 30 is disposed within axial bore 11 of body 10 against spring 19. Core 40 is attached to the body 10 by inserting the core 40 into the axial bore 11 of the body 10. In one embodiment, the core 40 is threaded into the axial bore 11, thereby maintaining the collar between the body 10 and the core 40. The chamber 60 is attached to the second end 13 of the body 10.

Figure 3:
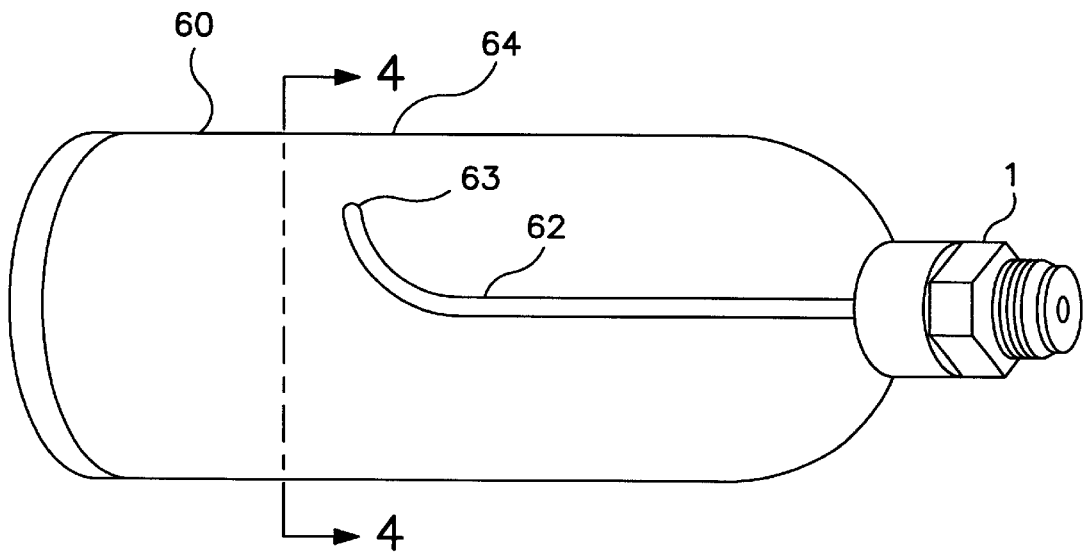
FIG. 3 is a prospective view of a chamber and valve of the present invention having a transparent chamber.
Figure 4:
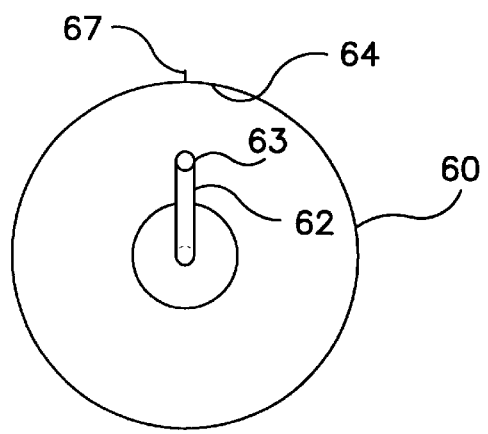
FIG. 4 is a cross sectional view of the chamber and valve shown in FIG. 3.
Figure 5:
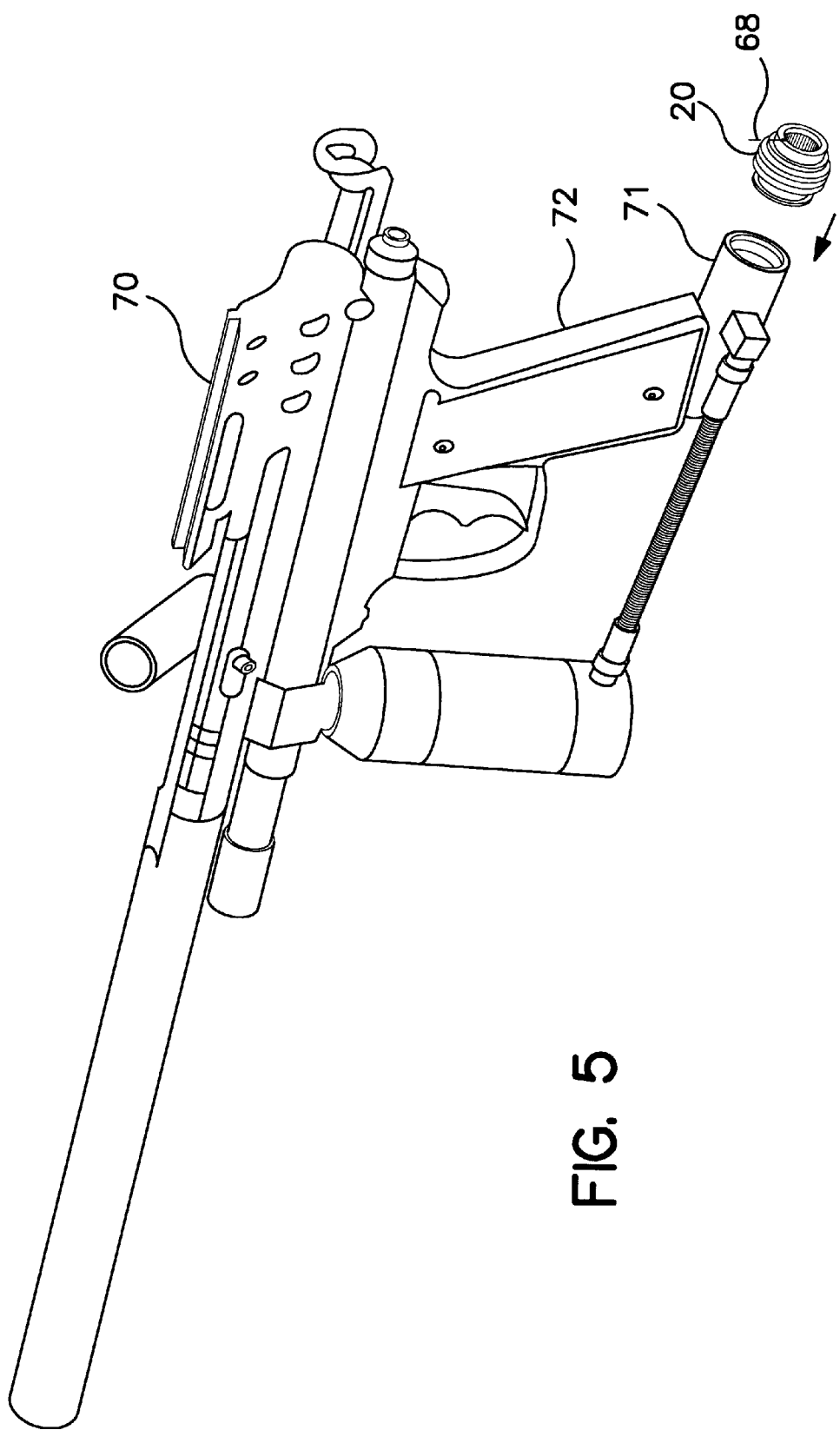
FIG. 5 is a prospective view of a paintball gun and collar of the valve of the present invention.

As shown in FIG. 3, gas cylinder, or chamber, 60 contains a syphon 62 attached to the valve 1. As illustrated, syphon 62 is bent towards the inner wall 64 of the chamber 60. FIG. 4 illustrates a paintball gun 70 with an ASA 71 for attaching the chamber 60 to the handle 72, a configuration known as a "back bottle system." It is desired to have the end 63 of syphon 62 facing upward against gravity when the chamber 60 is attached to the paintgun 70. Because the collar 20 of the present invention is removably fitted on the body 10 of the valve 1, the chamber 60 is rotationally adjustable with respect to the collar 20 by selectively mounting the collar 20 on the body 10 of valve 1.

One method of adjusting the chamber 60 so that the syphon 62 is positioned upwards when the chamber 60 is attached to the paintgun 70 is as follows. During the manufacture of the chamber 60, the direction in which the syphon 62 is directed is indicated on the chamber 60, for example by a hatch mark painted, engraved or providing a chamber mark 67 on the chamber 60. When matching with a particular paintgun, the collar 20 is attached to the paintgun 70 ASA 71 without the remaining valve 1 and chamber 60 attached. Once securely attached to the paintgun 70, the collar 20 is marked with a collar mark 68 indicating the upward orientation of the paintgun 70. The collar 20 is then detached from the paintgun 70 and mounted on the body 10 with the collar mark 68 on the collar 20 lined up with the chamber mark 67 on the chamber 60. The core 40 is then inserted into the body 10, as described above to assemble the valve 1. Upon completion, the combined valve 1 and chamber 60 will properly align with the syphon 62 oriented upward when attached to the paintball gun 70.

While the invention has been particularly shown and described with reference to a particular embodiment thereof, it will be understood by those skilled in the art that various changes in form and detail may be made therein without departing from the spirit and scope of the invention. The present example and embodiment, therefore, are to be considered in all respects as illustrative and not restrictive, and the invention is not to be limited to the details given herein.

What is claimed is:

1. A valve for a gas cylinder, comprising:
   a body having an axial bore providing a passageway for flow of fluid;
   a collar being mounted and rotationally fixed on the body; and
   a core being attached to the body;
   whereby the collar is maintained between the body and the core when the core is attached to the body.

2. The valve of claim 1, wherein the collar has an inner surface, the inner surface being adapted to mate with an outer surface of the body.

3. The valve of claim 2, wherein inner surface of the collar is splined to mate with a spline in the outer surface of the body.

4. The valve of claim 1, wherein a key is inserted in a keyway in the body and a keyway in the collar to removably fix the collar on the body.

5. The valve of claim 1, wherein a pin is inserted in the body and the pin is inserted in the collar to removably fix the collar on the body.

6. The valve of claim 1, wherein the collar has an outer surface, the outer surface being adapted to attach to an external member for accepting or discharging fluid.

7. The valve of claim 6, wherein the outer surface of the collar is threaded.

8. The valve of claim 1, wherein the core is inserted into the axial bore of the body.

9. The valve of claim 8, wherein the core has an outer surface which is adapted to mate with an inner surface of the body.

10. The valve of claim 9, wherein the outer surface of the core is threaded and mates with the inner surface of the body.

11. The valve of claim 1, wherein a pin is disposed within the axial bore of the body, the pin being biased for movement between a sealed position, arresting flow of fluid through the axial bore, and an open position, allowing flow of fluid through the axial bore of the body.

12. The valve of claim 11, wherein the pin is biased by a spring.

13. The valve of claim 11, wherein the core retains the pin within the body.

14. The valve of claim 13, wherein a sealing member is disposed between the pin and the core.

15. The valve of claim 1, wherein a first sealing member is disposed between the core and the body and a second sealing member is disposed between the core and the collar.

16. A gas cylinder, comprising:
   a body having a first end, a second end, and an axial bore providing a passageway for flow of fluid;
   a chamber for containing fluid, the chamber being attached to the second end of the body;
   a collar being mounted and rotationally fixed on the first end of the body; and
   a core being inserted into the body;
   whereby the collar is maintained between the body and the core when the core is inserted into the body.

17. The gas cylinder of claim 16, wherein the body is attached to a syphon that extends partially within the chamber, the syphon having a distal end proximate to a side wall of the chamber.

18. The gas cylinder of claim 17, wherein the collar is adjustably mounted on the body to selectively allow the collar to be oriented with the distal end of the syphon.

19. A valve for filling or discharging a gas cylinder comprising:
   a body having a first end, a second end, and an axial bore for providing a passageway for flow of fluid;
   a spring disposed within the axial bore of the body supported by the second end of the body;
   a pin disposed within the axial bore of the body, the pin being biased against the spring for movement between a sealed position, arresting flow of fluid through the axial bore, and an open position, allowing flow of fluid through the axial bore of the body;
   a collar having an outer surface for engaging an external member for accepting or discharging fluid, the collar removably mounted and rotationally fixed on the first end of the body; and
   a core having an axial bore for receiving the pin and providing a passageway for flow of the fluid, the core being removably received by the body;
   wherein the core has a head for retaining the collar on the body when the core is received by the body.

20. A method for making a valve for a gas cylinder, comprising:
   mounting a collar on a body in a rotationally fixed position, the body having an axial bore providing a passageway for flow of fluid; and
   attaching a core to the body;
   whereby the collar is maintained between the body and the core when the core is attached to the body.

21. The method of claim 20, further comprising disposing a spring within the axial bore of the body, the spring being supported by the body; and
   disposing a pin within the axial bore of the body, the spring biasing the pin against the core.

22. The method of claim 21, further comprising mounting the collar on the first end of the body and attaching a chamber to a second end of the body.

23. The method of claim 20, wherein mounting the collar on the body further comprises aligning a plurality of internal grooves on the collar with a mating plurality of splines on the body.

24. The method of claim 20, wherein attaching the core to the body further comprises threadingly mating the core to the body.

25. A method for making a gas cylinder, comprising:
   attaching a syphon to a body having an axial bore defining an axis, the syphon having a distal end that terminates away from the axis;
   attaching the body to a chamber, the syphon being inside the chamber;
   mounting a collar on the body in a rotationally fixed position, the body having an axial bore providing a passageway for flow of fluid; and attaching a core to the body;

whereby the collar is maintained between the body and the core when the core is attached to the body.

26. A method for making a gas cylinder, comprising:

attaching a syphon to a body having an axial bore defining an axis, the syphon having a distal end that bends away from the axis;

attaching the body to a chamber, the syphon being inside the chamber;

upon attaching the body to the chamber, providing a chamber mark on the chamber to indicate the direction in which the distal end of the syphon is pointed;

fitting the collar securely to an ASA on a paintgun;

providing a collar mark on the collar to indicate the upward orientation of the paintgun when the paintgun is in a firing position;

detaching the collar from the paintgun;

mounting the collar on the body in a rotationally fixed position so that the collar mark is aligned with the chamber mark; and attaching a core to the body;

whereby the collar is maintained between the body and the core when the core is attached to the body and the distal end of the syphon is oriented upward when the chamber is attached to the ASA.

* * * * *